United States Patent [19]
Kunisawa

[11] Patent Number: 5,978,683
[45] Date of Patent: Nov. 2, 1999

[54] COMMUNICATION APPARATUS AND COMMUNICATION METHOD

[75] Inventor: Yoshio Kunisawa, Saitama, Japan

[73] Assignee: Sony Corporation, Tokyo, Japan

[21] Appl. No.: 08/802,864

[22] Filed: Feb. 19, 1997

[30] Foreign Application Priority Data

Feb. 22, 1996 [JP] Japan .................................. 8-034808

[51] Int. Cl.⁶ ............................................. H04Q 7/32
[52] U.S. Cl. .................... 455/462; 455/465; 455/11.1; 455/13.2
[58] Field of Search ................................. 455/403, 422, 455/426, 462, 502, 551, 550, 553, 517, 524, 445, 465, 31.1, 31.2, 420, 554, 555, 11.1, 13.1, 13.2; 370/445, 345

[56] References Cited

U.S. PATENT DOCUMENTS

| | | | |
|---|---|---|---|
| 4,989,230 | 1/1991 | Gillig et al. | 455/566 |
| 5,408,679 | 4/1995 | Masuda | 455/11.1 |
| 5,428,668 | 6/1995 | Dent et al. | 455/452 |
| 5,493,693 | 2/1996 | Tanaka et al. | 455/553 |
| 5,526,403 | 6/1996 | Tam | 455/426 |
| 5,528,597 | 6/1996 | Gerszberg et al. | 455/422 |
| 5,594,782 | 1/1997 | Zicker et al. | 455/426 |
| 5,598,459 | 1/1997 | Haartsen | 455/11.1 |
| 5,613,211 | 3/1997 | Matsuno | 455/524 |
| 5,617,468 | 4/1997 | Nojima et al. | 455/554 |
| 5,659,598 | 8/1997 | Byrne et al. | 455/436 |
| 5,673,708 | 10/1997 | Akhavan | 455/417 |
| 5,710,764 | 1/1998 | Yoshimura et al. | 455/11.1 |
| 5,745,851 | 4/1998 | Goto | 455/432 |
| 5,757,792 | 5/1998 | Aoki | 370/347 |
| 5,768,683 | 10/1995 | Mulford | 455/11.1 |

*Primary Examiner*—William G. Trost
*Assistant Examiner*—Jean A. Gelin
*Attorney, Agent, or Firm*—Jay H. Maioli

[57] ABSTRACT

A communication apparatus used in a digital cordless telephone system, such as a personal headphone system (PHS) having a local base station and a local mode subscriber, in which, if the local mode subscriber is set for use in the local mode, the local mode subscriber can respond to signals of the public mode. If the local base station receives incoming call signals of the public mode from a public base station, the received call signals are transferred from the local base station to the local mode subscriber. This enables the incoming call signals from the public base station to be received via the public base station by the local mode subscriber even if the latter is in the local mode. If, with the local mode subscriber set to the local mode, the local base station receives incoming call signals of the public mode from the public base station, the local base station transmits the call signals to the local mode subscriber. If the local base station receives call signals from the local mode subscriber, the call signals are transmitted by the local base station to the public base station. This enables the communication in the public mode to be had by the local mode subscriber via the local base station even if the local mode subscriber is set to the local mode.

13 Claims, 9 Drawing Sheets

FIG. 6A CONTROL SLOT (INCLUDING SCCH)
FIG. 6B CONTROL SLOT (INCLUDING BCCH, PCH)
FIG. 6C COMMUNICATION SLOT (INCLUDING TCH)

COMMUNICATION APPARATUS AND COMMUNICATION METHOD

BACKGROUND OF THE INVENTION

1. Field of the Invention

This invention relates to a communication apparatus and a communication method used in a digital cordless telephone system, such as a personal headphone system (PHS).

2. Description of the Related Art

Among communication apparatus used in, for example, the digital cordless telephone system, there are an apparatus having the function of a local base station with reset to other communication equipments, and a local mode subscriber, as a communication equipment having the function of communicating with the local base station.

In such communication apparatus, the subscriber usually can be selectively used for a public mode or for a local mode. The public mode is a mode for the subscriber to have communication of the information via a public base station, which is a radio station installed for public use. This public mode is used when the subscriber is used outdoors independently. The local mode is such a mode in which the communication of the information by the subscriber is had via an equipment installed in, for example, a domicile, as a local base station, that is in which the subscriber is used in the domicile in the vicinity of the local base station.

Heretofore, the local mode subscriber cannot be used for the public mode and the local mode simultaneously, such that it has been necessary to select whether the local mode subscriber should be used in the public mode or in the local mode. That is, in the conventional communication apparatus, it has been necessary to set the subscriber for use in the public mode or in the local mode depending on the state in which it is used.

Thus the subscriber of the conventional communication apparatus cannot receive incoming call signals of different modes. For example, if, in the conventional communication apparatus, the local mode subscriber is set for use in the local mode, it has not been possible with the local mode subscriber to respond to the incoming call signal of the public mode.

SUMMARY OF THE INVENTION

It is therefore an object of the present invention to provide a communication apparatus and a communication method in which it is possible for a local mode subscriber to respond to signals of the public mode even if the subscriber is set so as to be used in the local mode.

In one aspect, the present invention provides a communication apparatus including radio communication means for transmission/reception to or from a first destination or a second destination in a first mode or in a second mode, respectively, wired communication means for having communication using a wired circuit, and communication control means for controlling the operations of the radio communication means and the wired communication means.

In another aspect, the present invention provides a communication method comprising the steps of receiving a signal from a first destination in a first mode, transmitting a signal to a second destination in a second mode in synchronism with the signal from the first destination, establishing a communication link to the first destination and a communication link to the second destination, and connecting these links for having communication from the first destination to the second destination.

According to the present invention, as described above, both the signals from the telephone network connected to the local base station and those from the public base station can be received simultaneously without the necessity of utilizing telephone transfer services.

That is, according to the present invention, the local mode subscriber can be used simultaneously in the public mode and in the local mode, such that, if the local mode subscriber is set for use in the local mode, it can respond to signals of the public mode.

DESCRIPTION OF THE PREFERRED EMBODIMENTS

In an illustrative embodiment, now explained, the present invention is applied to a personal handy-phone system, which is a communication apparatus or system comprised of an equipment having the function of a local base station with respect to other communication equipments and a local mode subscriber as a communication equipment having the function of having communication with the local base station.

It should be noted that the present invention is not limited to the following embodiment and may be modified as to, for example, the structure, without deviating from the purport of the invention. In particular, the present invention is not limited to the personal handy-phone system, but may be applied to a communication equipment having the function of a local base station with respect to other communication equipments or to a communication apparatus comprised of a local base station and a local mode subscriber.

The local base station of the communication device of the instant embodiment is hereinafter explained.

Figure 1:
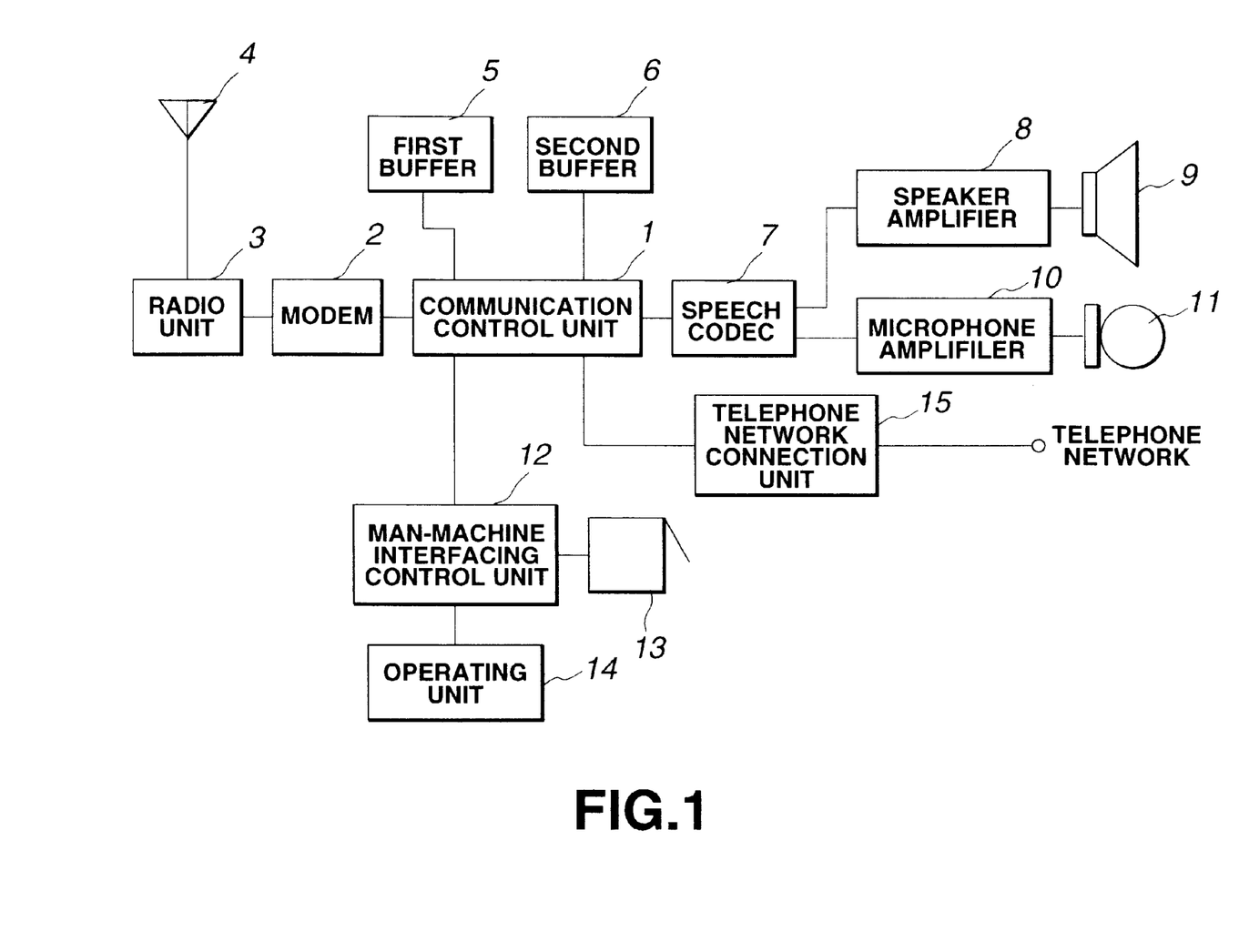
FIG. 1 is a block diagram showing an illustrative structure of a local base station of a communication apparatus according to the present invention.

The local base station of the communication device of the instant embodiment has the function of a telephone capable of having communication over a wired telephone network, and the function of a local base station with respect to the local mode subscriber. Referring to FIG. 1, the local base station includes a communication control unit 1 for performing control on communication, a modem 2 connected to the communication control unit 1 and a radio unit 3 connected to the modem 2. The local base station also includes a first buffer 5 connected to the communication control unit 1 and a second buffer 6 connected to the communication control unit 1. The local base station also includes a speech codec unit 7 connected to the communication control unit 1 and a speaker 9 connected via a speaker amplifier 8 to the speech codec unit 7. The local base station also includes a man/machine interface control unit 12 connected to the communication control unit 1 and a ringer unit 13 connected to the man/machine interface control unit 12. The local base station further includes an operating unit 14 connected to the man/machine interface control unit 12 and a telephone network connecting unit 15 connected to the communication control unit 1.

In the above-described local base station, the communication control unit 1, modem 2, radio unit 3, antenna 4, first buffer 5 and the second buffer 6 are mainly used for having communication with a public base station or with a local mode subscriber.

Specifically, the communication control unit 1 performs control on communication. Specifically, the communication control unit 1 receives a control signal transmitted by the public base station and sets the time divisional multiple access slot synchronization (TDMA slot synchronization) to the control signal. The communication control unit 1 also has the function of receiving an incoming call signal from the public base station to transmit the call signal to a local mode subscriber, the function of receiving the call speech signal from the public base station and transmitting the call speech signal to the local mode subscriber and the function of receiving the call speech signal from the subscriber to transmit the call speech signal to the public base station.

The modem 2 connected to the communication control unit 1 performs processing, such as compansion and modulation/demodulation, on the call speech signal or on the control signal. The radio unit 3 connected to the modem 2 amplifies the transmission/reception signal or oscillates the carrier wave with the carrier frequency, while the antenna 4 connected to the radio unit 3 transmits or receives signals to or from the public base station 1 or to the subscriber. The first buffer 5 and the second buffer 6, connected to the communication control unit 1, are used when the call speech signals are transmitted to or received to or from the subscriber and the public base station via the local base station. Specifically, the first buffer 5 and the second buffer 6 are used for temporarily storing the call speech signals from the public base station and for temporarily storing the call speech signals from the local mode subscriber, respectively.

In the local base station, the speech codec unit 7, speaker amplifier 8, speaker 9, microphone amplifier 10 and the microphone 11 are used mainly when call is made by the local base station.

Specifically, the speaker amplifier 8 amplifies the signal from the speech codec unit 7 and sends the amplified signal to the speaker 9. The speaker 9 outputs the amplified signal as speech. The microphone 11 transduces the input speech into analog signals which are sent to the microphone amplifier 10. The microphone amplifier 10 amplifies or otherwise processes the input signal from the microphone 11 and sends the amplified signal to the speech codec unit 7. The speech codec unit 7 decodes the signal sent from the communication control unit 1 or converts the signal into analog signals which are sent to the speaker amplifier 8. The speech codec unit 7 processes the signals sent from the microphone amplifier 10 such as with digitization or encoding and sends the resulting signal to the communication control unit 1.

In the above-described local base station, the man/machine interface control unit 12, ringer unit 13 and the operating unit 14 are components taking part in man/machine interfacing of the present local base station.

Specifically, the man/machine interface control unit 12 performs control in connection with man/machine interfacing of the present local base station, and controls the operation of the ringer unit 13 and the operating unit 14. The ringer unit 13 is controlled by the man/machine interfacing control unit 12 and produces a sound notifying reception of an incoming call signal from outside. The operating unit 14 operates as an interfacing portion for the user and has a display device employing a liquid crystal, a dial key or the like. The operating unit 14 also includes, in addition to a dial key, a dedicated switch or key used for start or termination of call or mode switching for additional functions. The operating unit 14 is used for the user to enter dial signals in order for the user to make a telephone call from a local base station.

Also, in the above-described local base station, the telephone network connection unit 15 is used for connecting the local base station to the wired telephone network, and is used for receiving incoming call signals from outside, transmitting outgoing call signals or transmission/reception of call speech signals.

The main function and the operation of the above-described local base station is hereinafter explained.

The local base station has the function of receiving control signals from a public base station. When receiving the control signals from the public base station, the local base station receives control signals from the public base station via antenna 4. The control signals received by the antenna 4 are amplified or otherwise processed by the radio unit 3 and demodulated by the modem so as to be converted into baseband signals. The communication control unit 1 then sets the baseband signal to the TDMA slot synchronization. This matches the TDMA slot synchronization to the control signal for receiving the control signals from the public base station by the local base station.

The local base station also has the function of receiving the call speech signal from the public base station for transmitting the call speech signals to the local mode subscriber and the function of receiving the call speech signal from the local mode subscriber for transmitting the call speech signal to the public base station. That is, the call speech between the public base station and the local mode subscriber can be made via this local base station.

When the call speech signal from the public base station is received by the local base station to transmit the call speech signal to the local mode subscriber, the call speech signal from the public base station is first received over the antenna 4. The call speech signal received by the antenna 4 is amplified or otherwise processed by the radio unit 3 and demodulated by the modem 2 so as to be converted into the baseband signal. From the base band signals, the speech data, for example, to be transmitted by the communication control unit 1 from the public base station to the local subscriber, is taken out and transiently stored in the first buffer 5. The communication control unit 1 then takes out the speech data, for example, from the first buffer 5 in timed relation to the transmission slot timing to the local subscriber and modulates the speech data by the modem 2. The speech data is then amplified or otherwise processed by the radio unit 3 to generate call speech signals which are transmitted over the antenna 4 to the local mode subscriber. The speech data, for example, is transmitted over an information channel.

When the call speech signal from the local subscriber is received by the local base station and sent to the public base station, the call signal from the local mode subscriber is received over the antenna 4. The call speech signal received by the antenna 4 is amplified or otherwise processed by the radio unit 3 and demodulated by the modem 2 for conversion into baseband signals. From the baseband signal, the speech data, for example, to be transmitted by the communication control unit 1 from the local mode subscriber to the public base station, is taken out so as to be temporarily stored in the second buffer 6. The communication control unit 1 then takes out speech data, for example, from the second buffer 6, in timed relation with the transmission slot timing to the public base station. The speech data is then amplified or otherwise processed by the radio unit 3 to generate call signals which are transmitted over the antenna 4 to the public base station. The speech data is transmitted on the information channel, as will be explained subsequently.

The foregoing is the description of the structure and the operation of the local mode base station with reference to FIG. 1. However, the local mode base station need not necessarily be constructed as shown in FIG. 1, but may also be constructed as shown in FIG. 2.

Figure 2:
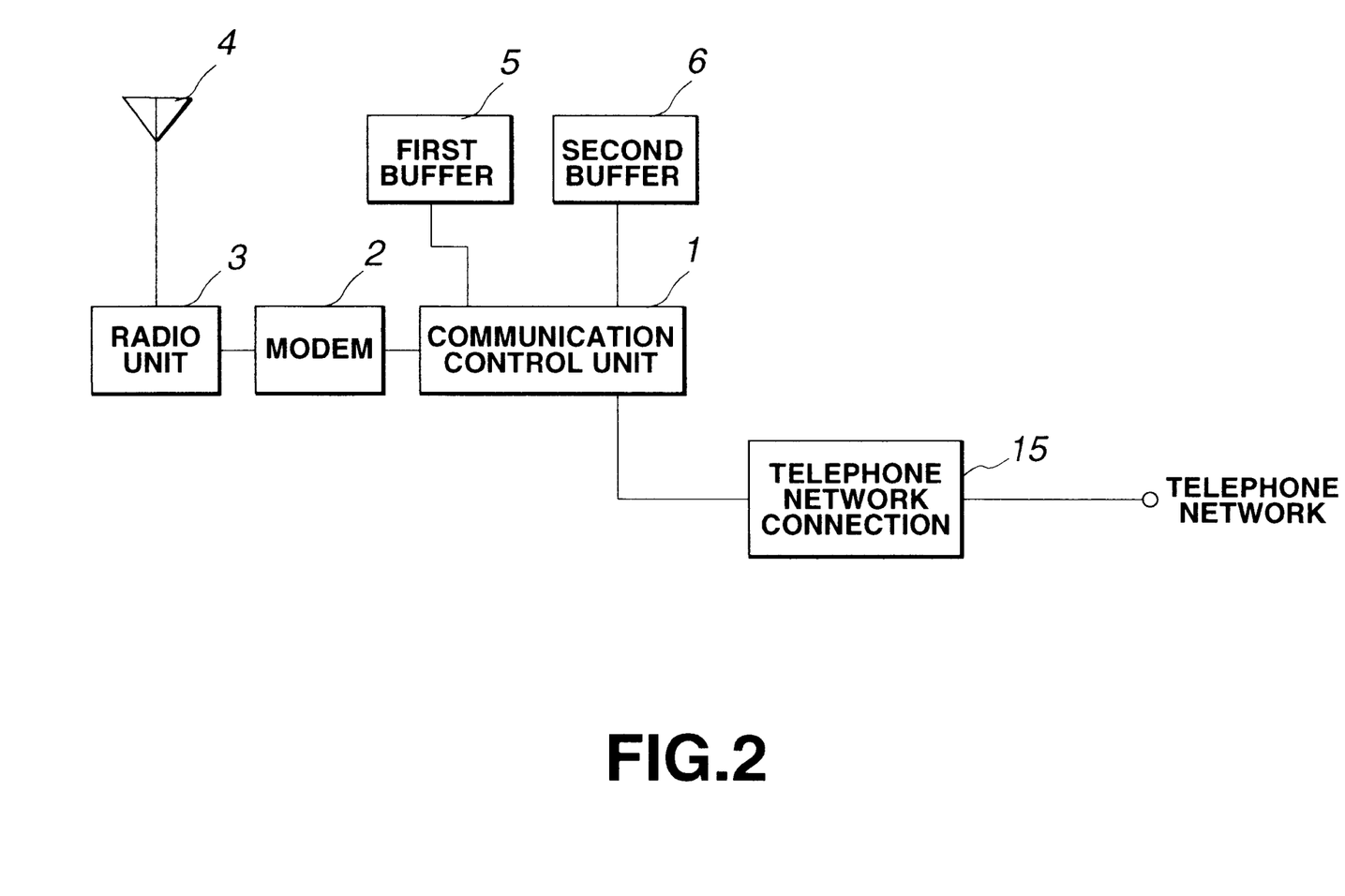
FIG. 2 is a block diagram showing another illustrative structure of a local base station of a communication apparatus according to the present invention.

That is, FIG. 2 shows a structure of the user interfacing and related portion of FIG. 1 less the speech signal transmission/reception related portion. In the local mode base station, configured as shown in FIG. 2, equipment control performed by the man/machine interface control unit and the speech transmission/reception performed by the ringer operation/speech codec unit and the microphone speaker, are not carried out by this signal transmission/reception. This operation is performed in its entirety by the local mode subscriber connected by a radio route to the local mode base station. The operation is not specifically explained since it is the same as the operation in the local base station or as the operation of the local mode subscriber which will be explained later.

The other operation, such as that of the call control unit, is the same as that of the local base station shown in FIG. 1.

A local mode subscriber of the communication apparatus of the instant embodiment is hereinafter explained.

Figure 3:
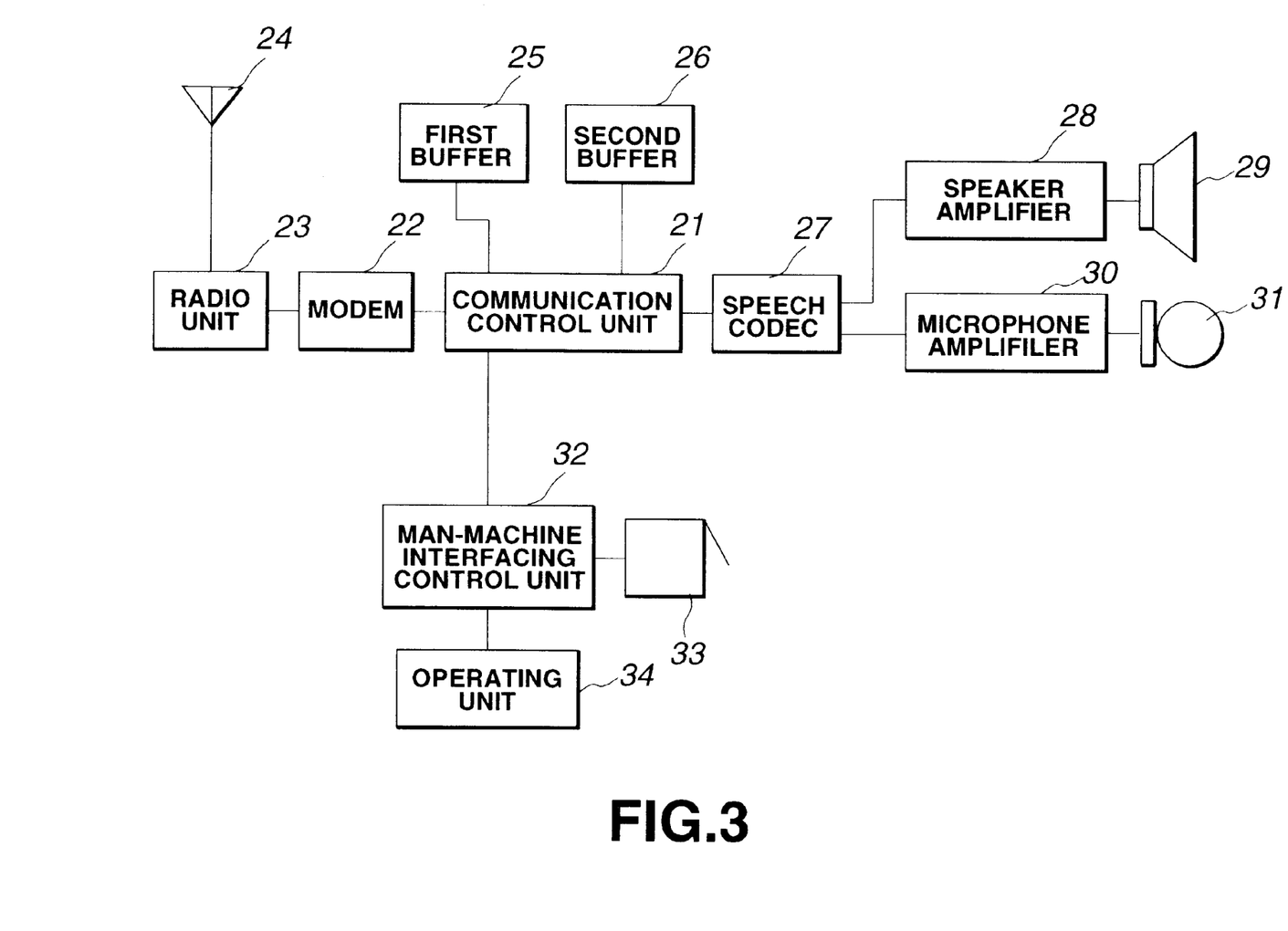
FIG. 3 is a block diagram showing an illustrative structure of a local mode subscriber of a communication apparatus according to the present invention.

The local mode subscriber of the communication apparatus of the instant embodiment has the function of having communication in the public mode and the function of having communication in the local mode. Referring to FIG. 3, the local mode subscriber includes a communication control unit 21 for performing control on the communication and a modem 22 connected to the communication control unit 21. The local mode subscriber also includes a radio unit 23 connected to the modem 22 and an antenna 24 connected to the radio unit 23. The local mode subscriber also includes a first buffer 25 connected to the communication control unit 21 and a second buffer 26 connected to the communication control unit 21. The local mode subscriber also includes a speech codec unit 27 connected to the communication control unit 21 and a speaker 29 connected to the speech codec unit 27 via a speaker amplifier 28. The local mode subscriber also includes a microphone 31 connected to the speech codec unit 27 via a speaker amplifier 28 and a man-machine interface control unit 32 connected to the communication control unit 21. The local mode subscriber further includes a ringer unit 33 connected to the man-machine interface control unit 32 and an operating unit 34 connected to the man-machine interface control unit 32.

In the above-described local mode subscriber, the communication control unit 21, modem 22, radio unit 23, antenna 24, first buffer 25 and the second buffer 26 are used mainly when having communication with a public base station or with a local base station.

Specifically, the communication control unit 21 performs control on the communication, and receives control signals from the public base station or the local base station for setting the TDMA slot synchronization to the control signals. The communication control unit 21 also has the functions of receiving incoming call signal from the public base station or the local base station, the function of receiving call speech signals from the public base station or the local base station and the function of transmitting the call speech signals to the public base station or to the local base station.

The modem 22 connected to the communication control unit 21 compands or modulates/demodulates call speech signals or control signals. The radio unit 23 connected to the modem 22 amplifies transmission/reception signals or oscillates carrier waves at a carrier frequency, while the antenna 24 connected to the radio unit 23 transmits and/or receives signals to or from the public base station or the local base station. The first buffer 25 and the second buffer 26, connected to the communication control unit 21, are used when transmitting and/or receiving call speech signals to or from the public base station or the local base station. The first buffer 25 temporarily stores call speech signals when receiving the call speech signals from the public base station or the local base station, while the second buffer 26 temporarily stores call speech signals when transmitting the call speech signals from the local mode subscriber.

In the local mode subscriber, the speech codec unit 27, speaker amplifier 28, speaker 28, microphone amplifier 30 and the microphone 31 are used mainly when call is made by this local mode subscriber.

Specifically, the speaker amplifier 28 amplifies or otherwise processes signals from the speech codec unit 27 and sends the amplified signals to the speaker 29. The speaker 29 outputs the signals, amplified or otherwise processed by the speaker amplifier 28, as speech signals. The microphone 31 converts the input speech signals into analog signals and sends the signals to the microphone amplifier 30. The microphone amplifier 30 amplifies the input signals from the microphone 31 and sends the amplified signals to the speech codec unit 27. The speech codec unit 27 processes the signals sent from the communication control unit 21 with decoding and conversion to analog signals and sends the resulting signals to the speaker amplifier 28. The speech codec unit 27 also processes the signals sent from the microphone amplifier 30 with conversion to digital signals or encoding and sends the resulting signals to the communication control unit 21.

In the above-described local mode subscriber, the man/machine interfacing control unit 32, ringer unit 33 and the operating unit 34 are components taking part in man/machine interfacing of the local mode subscriber.

Specifically, the man/machine interfacing control unit 32 performs control on the man/machine interfacing of the present local mode subscriber and controls the operation of the ringer unit 33 or the operating unit 34. The ringer unit 33 is controlled by this man/machine interfacing control unit 32 for producing a sound notifying reception of an incoming call from outside. The operating unit 34 acts as an interfacing portion with respect to the user and has a display unit employing a liquid crystal and a dial key etc. The operating unit 34 has, in addition to the dial key, dedicated switches or keys used for start or termination of call or mode switching for additional functions. This operating unit 34 is used by the user as when he or she enters the telephone number in order to make a call from the local mode subscriber.

The main function and the operation of the local mode subscriber are hereinafter explained.

The local mode subscriber has the function of receiving control signals from the public base station via a local base station if the subscriber is set to the local mode. If, in the local mode, control signals from the public base station are received by the local mode subscriber from the public base station via the local base station, the control signals, received from the public base station via local base station, are received by the antenna 24 of the local mode subscriber. The control signals received by the antenna 24 are amplified or otherwise processed by the radio unit 23 and further demodulated by the modem 22 for conversion to baseband signals. The baseband signals are synchronized by TDMA slot synchronization by the communication control unit 21. This achieves TDMA slot synchronization with respect to the control signals such that the control signals transmitted from the local base station are received by the local mode subscriber.

If set to the public mode, the local mode subscriber directly receives the control signals from the public base station as in the case of the conventional personal handy-phone system.

The local mode subscriber also has the function of receiving call speech signals from the public base station via the local base station and the function of transmitting call speech signals to the public base station via the local base station even if the local mode subscriber is set to the local mode. Specifically, the local mode subscriber can transmit and/or receive call speech signals to or from the public base station even if the local mode subscriber is set to the local mode.

When the call speech signals from the public base station are received by the local mode subscriber via the local base station, the call speech signals transmitted from the local base station are received by the antenna 24 of the local mode subscriber. The radio unit 23 amplifies or otherwise processes call speech signals received over the antenna 24 and demodulates the resulting signals by the modem 22 for conversion to baseband signals. From the baseband signals, speech data, for example, are taken out by the communication control unit 21 so as to be temporarily stored in the first buffer 25. The speech data, for example, are taken out sequentially from the first buffer 25 by the communication control unit 21 so as to be then processed by the speech codec unit 27 with decoding and conversion to analog signals. The resulting signals are amplified or otherwise processed by the speaker amplifier 28 so as to be then outputted via the speaker 29.

When the call speech signals are transmitted by the local mode subscriber via the local base station to the public base station, the speech, for example, entering the microphone 31, is converted by the microphone 31 into analog speech data, which is then amplified or otherwise processed by the microphone amplifier 30 and further processed by the speech codec unit 27 with encoding or conversion to digital signals. Under control by the communication control unit 21, the speech data is temporarily stored in the second buffer 26 and subsequently taken out therefrom in timed relation to the transmission slot timing to the local base station. The speech data and so forth, taken out from the second buffer 26, is modulated or otherwise processed by the modem 22 and further amplified or otherwise processed by the radio unit 23 for conversion to speech call signals which are then sent to the local base station over the antenna 24. The speech data and so forth are transmitted over the information channel as will be explained subsequently.

If set to the public mode, the local mode subscriber directly transmits and/or receives speech call signals to or from the public base station as in the case of the conventional personal handy-phone system.

Signal transmission/reception by the public base station, corresponding to a communication apparatus comprised of a base station and a subscriber as described above, is hereinafter explained. The public base station of the conventional personal handy-phone system performs transmission/reception by a four-channel time-divisional multiple access system. However, in the following description, one of the time shared time slots is taken as an example.

Figure 4:
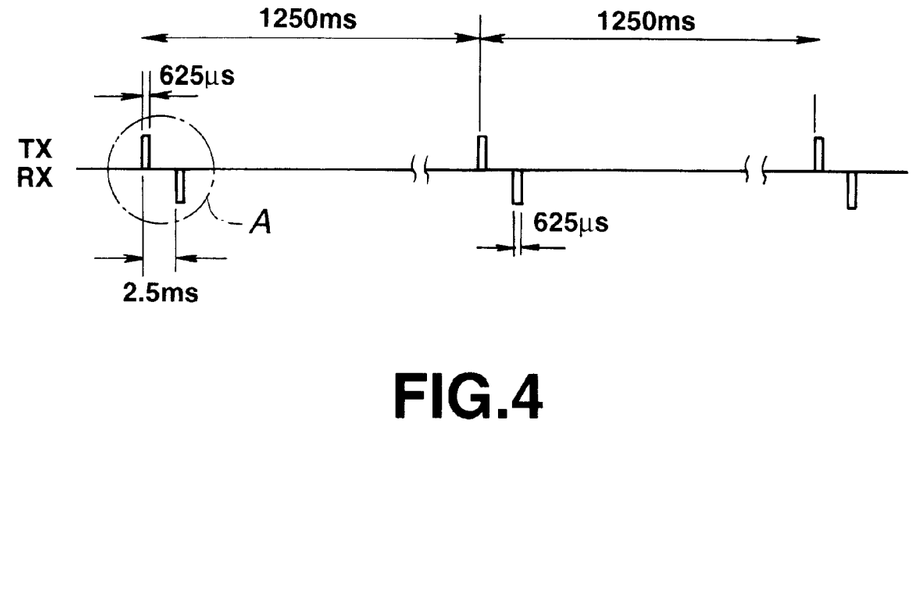
FIG. 4 illustrates the timing of transmission/reception of a logical control channel by the public base station.
Figure 5:
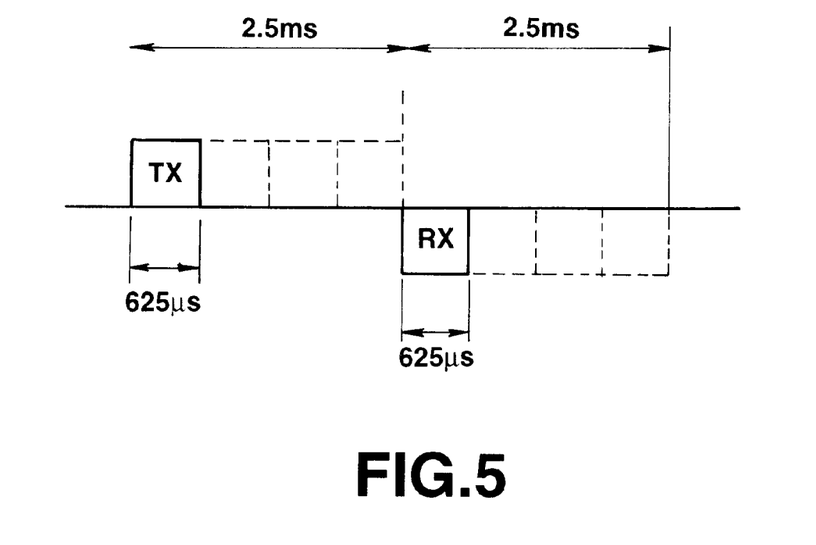
FIG. 5 shows a portion A in FIG. 4 to an enlarged scale.

FIG. 4 shows the typical timing of transmission/reception of the logical control channel (LCCH) by the public base station, while FIG. 5 shows a portion A in FIG. 4 to an enlarged scale. In FIGS. 4 and 5, TX and RX denote transmission from the public base station and reception by the public base station, respectively. That is, the public base station intermittently sends down-stream control signals once every 1250 ms by the control carrier of a pre-set frequency for sending various control signals to the local base station and to the local mode subscriber. The public base station receives up-stream control signals from the local base station or the local mode subscriber after lapse of 2.5 ms as from transmission of the down-stream control signals. The transmission time for one slot of the down-stream control signals and the reception time for one slot of the up-stream control signals, inclusive of the guard time, are each 625 s.

During transmission of the call speech signals, including the user information, such as speech data, the public base station intermittently transmits call speech signals every pre-set time interval by a carrier for communication of a pre-set frequency. The public base station receives up-stream call speech signals from the local base station or the local mode subscriber after lapse of 2.5 ms as from transmission of the down-stream call speech signals. The transmission time for one slot of the down-stream call speech signals and the reception time for one slot of the up-stream call speech signals, inclusive of the guard time, are each 625 s.

Figure 6A:
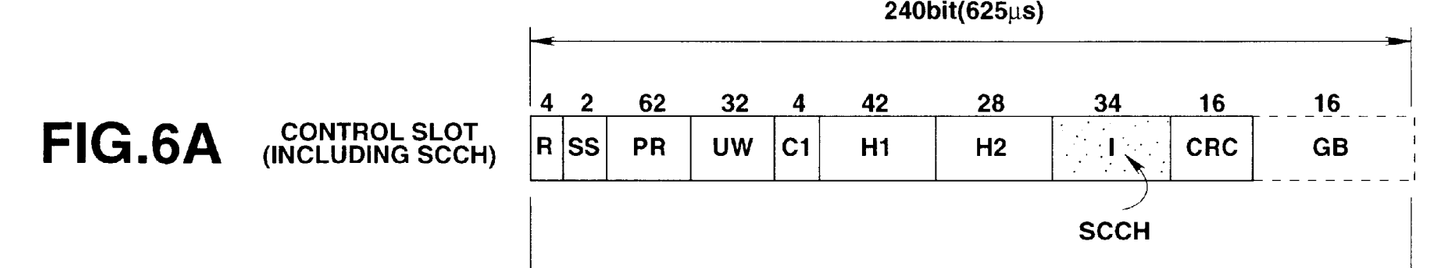
FIGS. 6A, 6B, 6C shows an example of a slot structure.
Figure 6B:
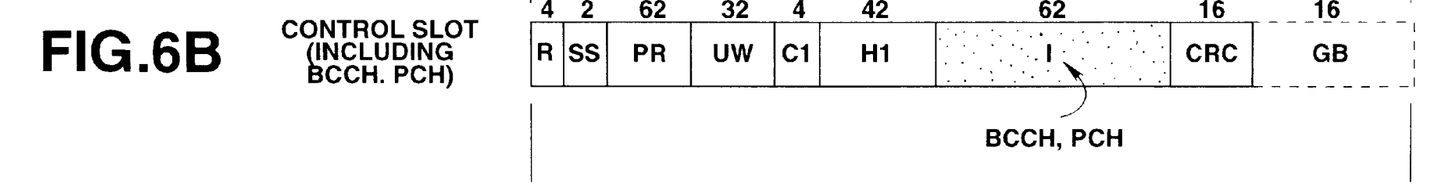
Figure 6C:
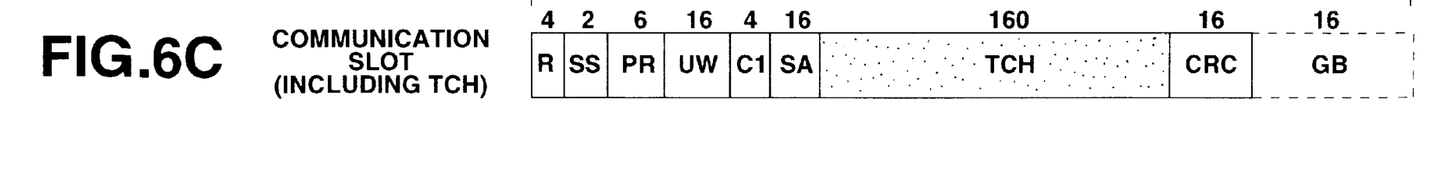

FIGS. 6A to 6C illustrate typical control slots for transmission/reception of the control signals and typical communication slots for transmission/reception of the call speech signals.

FIG. 6A shows the structure of a control slot inclusive of a signaling control channel (SCCH). Specifically, the control slot inclusive of the signaling control channel is comprised of 4 bits of transient response ramp time R, 2 bits of a start symbol SS, 62 bits of a preamble PR, 32 bits of a unique word UW, 4 bits of a channel identification CI, 42 bits of the outgoing identification code H1, 28 bits of incoming identification code H2, 34 bits of control data I, 16 bits of error detection parity CRC and 16 bits of guard bits (GB), totaling 240 bits, and has a length of 625 s. The signaling control channel is a bi-directional channel for transmitting the information necessary for call connection between the public base station and the communication apparatus. The portion of control data I of the control data shown in FIG. 5a corresponds to the signaling control channel.

FIG. 6B shows the structure of a control slot including a broadcast control channel (BCCH) or a paging channel (PCH). Specifically, the control channel including a broadcast control channel or a paging channel is comprised of 4 bits of transient response ramp time R, 2 bits of a start symbol SS, 62 bits of a preamble PR, 32 bits of a unique word UW, 4 bits of a channel identification CI, 42 bits of the outgoing identification code H1, 62 bits of control data I, 16 bits of error detection parity CRC and 16 bits of guard bits, totaling 240 bits, and has a length of 625 s. The broadcast control channel is a down-stream unidirectional channel for broadcasting the control information from the public base station to the communication apparatus, while the paging channel is a down-stream unidirectional channel for transferring the same information at a time from the public base station to plural communication apparatus. The portion of the control data I of the control slot shown in FIG. 6B represents the signaling channel or the paging channel.

FIG. 6C shows the structure of a communication slot including the information channel or traffic channel (TCH). That is, the communication slot containing the information channel is comprised of 4 bits of transient response ramp time R, 2 bits of a start symbol SS, 6 bits of a preamble PR, 16 bits of a unique word UW, 4 bits of a channel identification CI, 16 bits of the low-speed ancillary channel SA, 160 bits of the user information TCH, 16 bits of error detection parity CRC and 16 bits of guard bits (GB), totaling 240 bits, and has a length of 625 s. The information channel is a bi-directional channel transferring the user information, such as the speech data, between the public base station and the communication apparatus. The user information TCH of the communication slot shown in FIG. 6C represents the information channel.

When the call incoming from the network connected to the public base station to a local mode subscriber position-registered in a paging area, the public base station broadcasts the incoming call using the paging channel of the control slot. If the local mode subscriber is set to the public mode, it directly receives the incoming signal from the public base station. On the other hand, if the local mode subscriber is set to the local mode, it receives the incoming signal from the public base station via the local base station. That is, in the present embodiment, the local base station also receives the control carrier transmitted by the public base station and sets the TDMA slot synchronization to the control slot from the public base station, so that the local base station similarly receives the incoming signal from the public base station. If the local mode subscriber is set to the local mode, the incoming signal from the public base station is transmitted via the local base station to the local mode subscriber.

The signal flow when the signal from the public base station is received by the local mode subscriber via local base station is hereinafter explained.

The transmission/reception of the control signal between the public base station and the local base station occurs by a control carrier of a pre-set frequency (carrier for public control) fcp, while transmission/reception of the control signal between the local base station and the local mode subscriber occurs by another control carrier of a pre-set frequency (carrier for local mode control) fc different from the frequency ft1 for the carrier for public communication. The transmission/reception of the call speech signal between the public base station and the local base station occurs by a control carrier of a pre-set frequency (carrier for public communication) ft1, while transmission/reception of the call speech signal between the local base station and the local mode subscriber occurs by another control carrier of a pre-set frequency (carrier for local mode communication) ft2 different from the frequency ft1 for the carrier for public communication.

Figure 7:
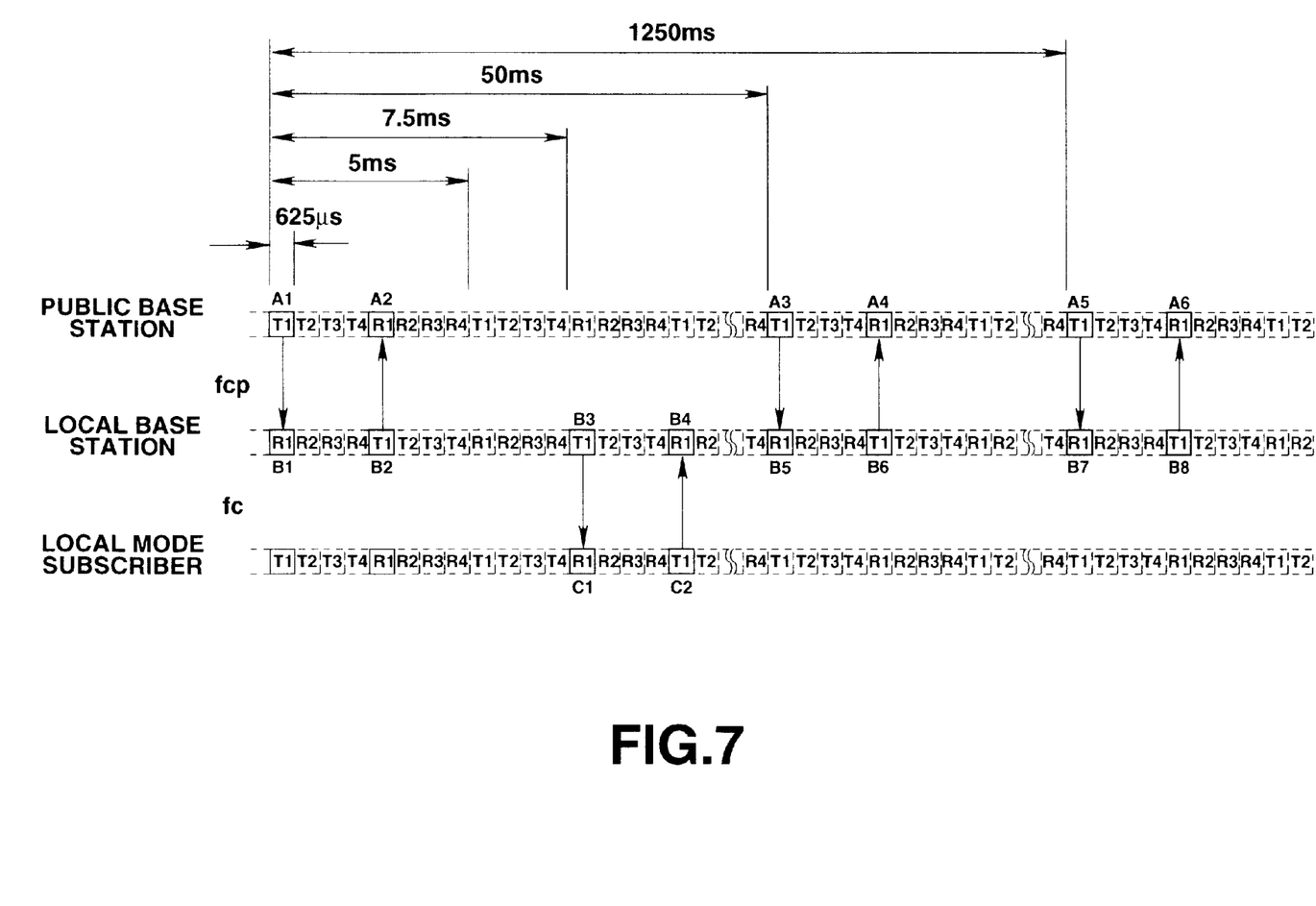
FIG. 7 shows the manner of transmission/reception of a control slot.

When the incoming signal from the public base station is received by the local mode subscriber via the local base station, the control slot transmission/reception occurs as shown in FIG. 7 showing the state of transmission/reception of the control slot between the public base station and the local base station and the state of transmission/reception of the control slot between the local base station and the local mode subscriber.

As shown in A1, A3 and A5 of FIG. 7, the public base station transmits the down-stream control slot by the carrier for public control fcp once every 50 ms. As shown in A2, A4 and A6 of FIG. 7, the public base station receives the up-stream control slot from the local base station or the local mode subscriber after 2.5 ms as from transmission of the down-stream control slot. The public base station broadcasts the incoming signal by the control slot once every 1250 ms, that is in A1 and A5 of FIG. 7.

On the other hand, the local base station sets the reception signal to the carrier for public control fcp and receives the carrier for public control fcp transmitted by the public base station. The local base station also sets the TDMA slot synchronization to the control slot from the public base station. That is, the local base station receives the control slot transmitted every 50 ms by the public base station, as shown in B1, B5 and B7 in FIG. 7 and sets the TDMA slot synchronization to the control slot. Also, for broadcasting the incoming call to the local mode subscriber, the local base station transmits the control slot to the local mode subscriber by the carrier for local mode control fc after 7.5 ms as from reception of the control slot transmitted from the public base station by the carrier for public control fcp. The period of a super-frame of a logical control channel transmitted by the local base station is selected to be equal to the period of the super-frame of the logical control channel transmitted by the public base station. Thus the local base station receives the up-stream control slot from the local mode subscriber after 2.5 ms as from reception of the down-stream control slot.

On the other hand, the local mode subscriber receives the carrier for local mode control fc transmitted by the local base station, with the reception frequency being set to the carrier for local mode control fc, and sets the TDMA slot synchronization to the control slot from the local base station. That is, the local mode subscriber receives the control slot from the local base station and sets the TDMA slot to the control slot, as shown in C1 in FIG. 7.

If, when the public base station, local base station and the local mode subscriber are operating in this manner, the public base station receives, from the network connected to the public base station, the incoming cal signal to the local mode subscriber position-registered in the paging area belonging to the public base station, the public base station broadcasts the incoming signals on the paging channel by the carrier for public control fcp.

The local base station sets the TDMA slot synchronization to the control slot from the public base station and receives the incoming signals from the public station carried on the paging channel. The local base station broadcasts the incoming call signal by the carrier for local mode fc on the paging channel, after 7.5 ms as from reception of the incoming signal from the public base station, as shown by an arrow from B3 to C1 in FIG. 7.

On the other hand, the local mode subscriber receives the incoming call signal carried by the carrier for local mode control fc from the local base station, with the TDMA slot synchronization being set to the control slot from the local base station. The local mode subscriber transmits the information necessary for call connection to the local base station on the signaling control channel, by the carrier for local mode fc, after 2.5 msec as from reception of the incoming signals from the local base station, as shown by an arrow from C2 to B4 in FIG. 7, in order to place a request for establishing a link channel.

On reception of the request from the local mode subscriber for establishing a link channel, the local base station transmits the information necessary for call connection to the public base station by the carrier for public control fcp, as shown by arrow from B6 to A4 in FIG. 7, in order to place a request for establishing the link channel.

Figure 8:
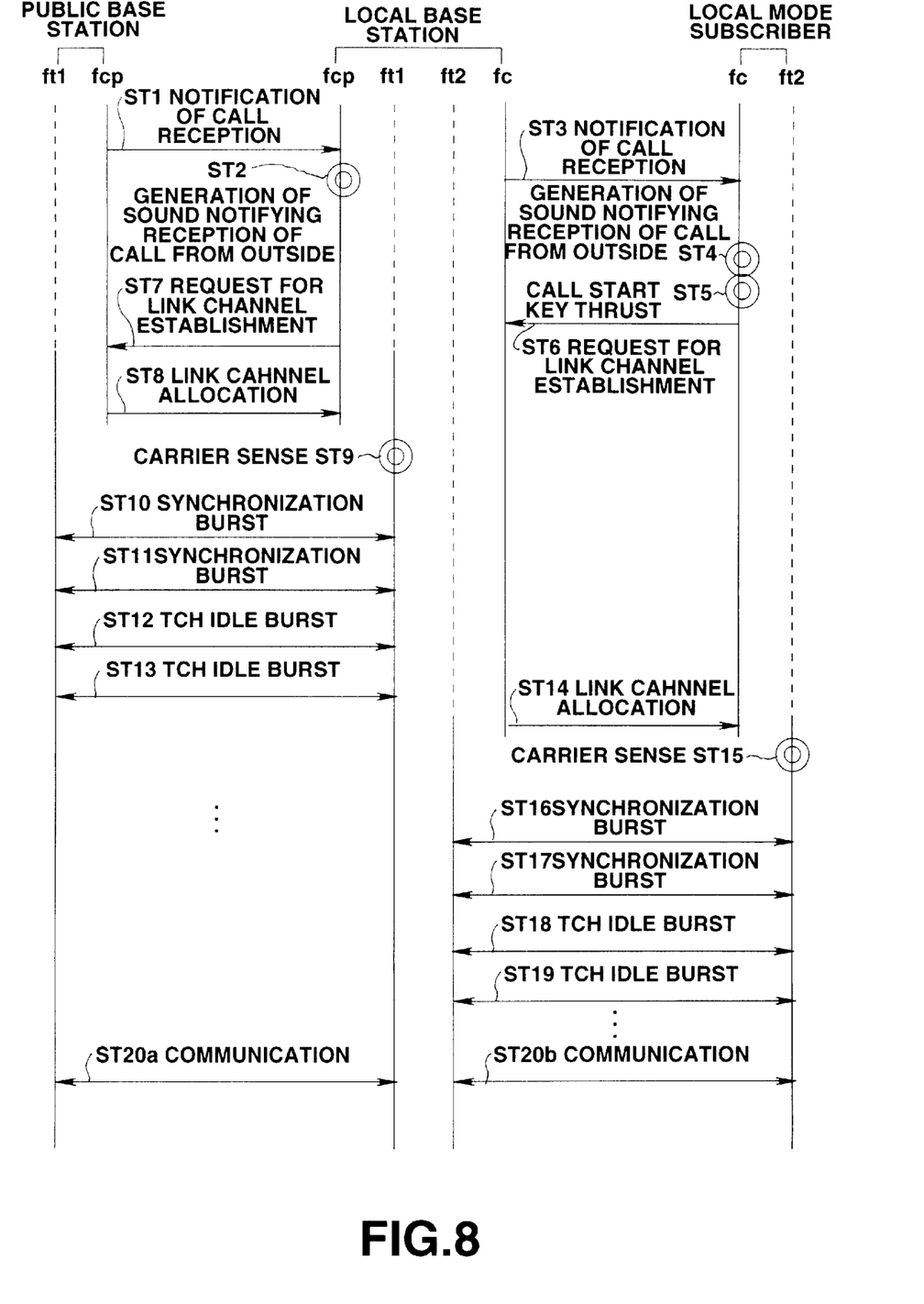
FIG. 8 shows a connection sequence.

Referring to FIG. 8, the connection sequence for receiving the incoming call signals from the public base station by the local mode subscriber via the local base station as described above is explained.

On reception of the incoming call signals to a local mode subscriber, position-controlled in the paging area belonging to a public base station, from the network to which is connected the public base station, the public base station broadcasts the incoming call to the local base station over the paging channel by the carrier for public mode fcp, as shown at step ST1.

On reception of the incoming call signals from the public base station, the local base station generates the sound notifying the incoming call from outside, as shown at step ST2, at the same time as it broadcasts the incoming of the call from outside on the paging channel by the carrier for local mode control fc, as shown at step ST3.

On reception of the incoming call from the local base station, the local mode subscriber produces the sound broadcasting the incoming call by the ringer unit, as shown at step ST4.

If a call speech start key of the local mode subscriber is thrust, as shown at step ST5, the local mode subscriber transmits the request for establishment of the link channel to the local base station by the carrier for local mode control fc, as shown at step ST6.

On reception of the request for establishing the link channel from the local mode subscriber, the local base station sends a request for establishing the link channel to the public base station by the public control carrier fcp, as shown at step ST7.

On reception of the request for establishing the link channel from the local base station, the public base station sends the information necessary for call connection on the signaling control channel by the carrier for public control fcp, as shown at step ST8, and allocates the link channel. The information necessary for call connection means the information on, for example, the slot position or the carrier number of the slot position used between the public base station and the local base station.

The local base station, to which the link channel has been allocated by the public base station, senses the carrier for the slot position and the carrier number of the specified call speech slot. If the slot has been found to be "not busy", the local base station sends a synchronization burst by the carrier for public communication ft1 to the public base station, as shown at step ST10.

On reception of the synchronization burst from the local base station, the public base station sends the synchronization burst by the carrier for public communication ft1 to the local base station.

On reception of the synchronization burst from the local base station, the public base station sends the synchronization burst to the local base station by the carrier for public communication ft1, as shown at step ST11.

On reception of the synchronization burst from the public base station, the local base station sends the TCH idle burst by the carrier for public communication ft1 to the public base station, as shown at step ST12.

On reception of the TCH idle burst from the local base station, the public base station sends the TCH idle burst to the local base station by the carrier for public communication ft1, as shown at step ST13.

On reception of the TCH idle burst from the public base station, the local base station sends the information necessary for call connection to the local mode subscriber by the carrier for local mode fc, on the signaling control channel, for allocating the link channel, as shown at step ST14. The information necessary for call connection is specifically the information on the slot position or the carrier number of the call speech slot used between the local base station and the local mode subscriber.

The local mode subscriber, to which the link channel has been allocated by the local base station, senses the carrier for the slot position and the carrier number of the specified call speech slot, as shown at step ST15. If the slot has been found to be "not busy", the local mode subscriber sends a synchronization burst by the carrier for local mode ft2 to the local base station, as shown at step ST16.

On reception of the synchronization burst from the local mode subscriber, the local base station sends the synchronization burst by the carrier for local mode ft2 to the local mode subscriber, as shown at step ST17.

On reception of the synchronization burst from the local base station, the local base station sends the TCH idle burst by the carrier for local mode communication ft2 to the local base station, as shown at step ST18.

On reception of the TCH idle burst from the local mode subscriber, the public base station sends the TCH idle burst to the local mode subscriber by the carrier for local mode communication ft2, as shown at step ST19.

Then, communication is had between the public base station and the local base station by the carrier for public communication ft1, as shown at step ST20a,. In addition, communication is had between the local base station and the local mode subscriber by the carrier for local mode communication ft2, as shown at step ST20b.

Thus, with the communication apparatus of the instant embodiment, if the incoming call signal to the local mode subscriber from the local base station is broadcast by the carrier for public control fcp, the incoming call signal is broadcast by the carrier for local mode fc by the local base station which has received the incoming signal. Thus, with the communication apparatus of the instant embodiment, the incoming call signal from the public base station is received via the local base station by the local mode subscriber even if the local mode subscriber is set to the local mode.

Figure 9:
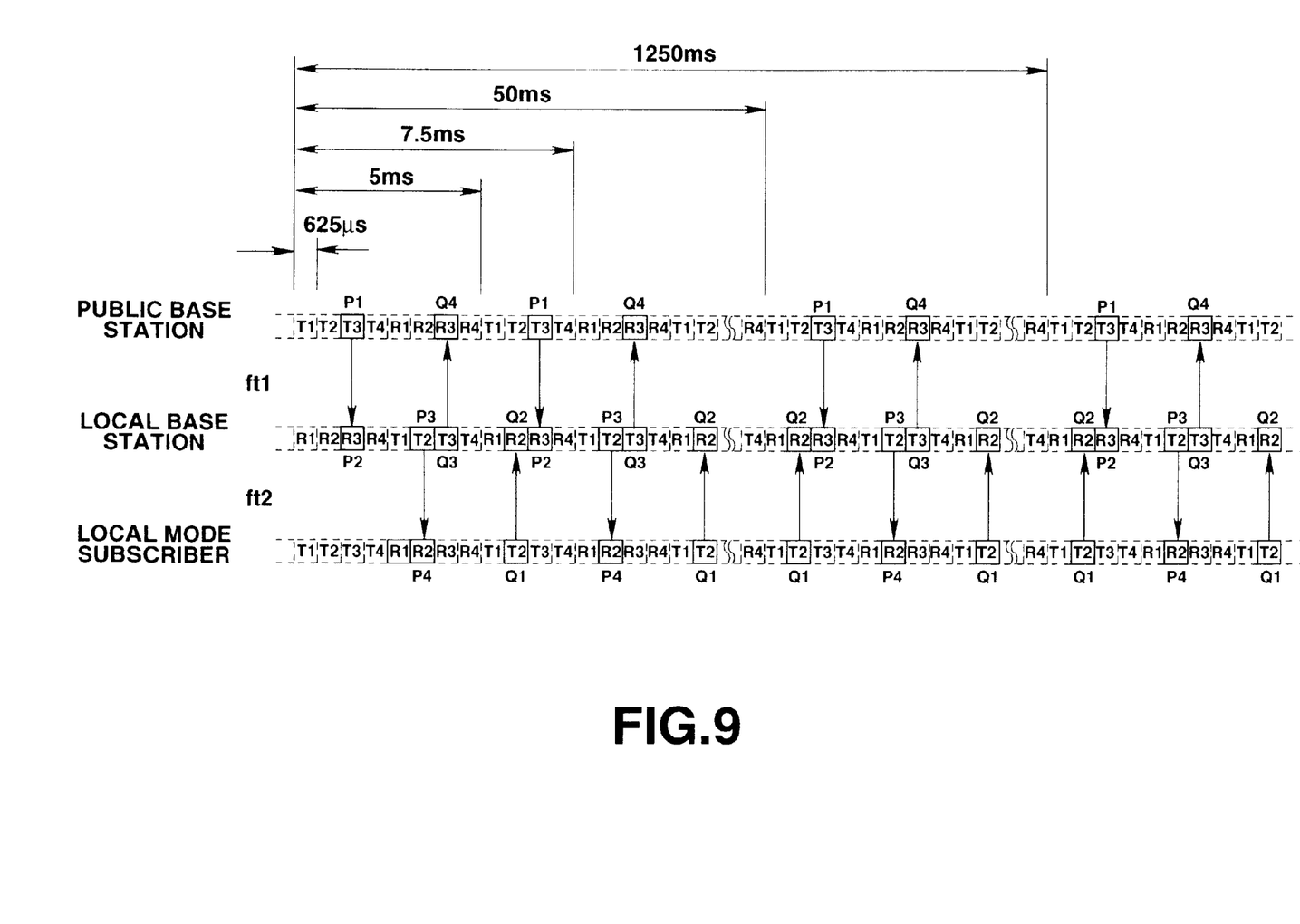
FIG. 9 shows the manner of transmission/reception of a communication slot.

Referring to FIG. 9, transmission/reception of call speech signals which is had between the public base station and the local mode subscriber via the local base station, is hereinafter explained. FIG. 9 shows the manner of transmission/reception of the slot for communication between the public base station and the local base station and the manner of transmission/reception of the slot for communication between the local base station and the local mode subscriber.

When transmitting call speech signals from the public base station to the local mode subscriber via the local base station, the public base station transmits the speech data to the local base station on the information channel of the communication slot by the carrier for public communication ft1, as indicated by an arrow from P1 to P2 in FIG. 9. The local base station, which has received the communication slot from the public base station, sets the TDMA slot synchronization to the slot for communication, and takes out the speech data from the information channel of the communication slot. The local base station then sends the speech data on the information channel of the communication slot to the local mode subscriber by the carrier for local communication ft2, as indicated by an arrow from P3 to P4 in FIG. 9.

On the other hand, when transmitting call speech signals from a local mode subscriber to the public base station via a local base station, the local mode subscriber sends the speech data to the public base station on the information channel of the communication slot by the carrier for local mode communication ft2, as indicated by arrow from Q1 to Q2 in FIG. 9. On reception of the communication slot from the local mode subscriber, the local base station sets the TDMA slot synchronization to the communication slot in order to take out the speech data from the information channel of the communication slot. The local base station then sends the speech data to the public base station on the information channel of the communication slot by the carrier for public communication ft1, as indicated by arrow from Q1 to Q2 in FIG. 9.

Thus, with the communication apparatus of the instant embodiment, if the local mode subscriber is set to the local mode, speech call signals can be transmitted from the local mode subscriber to the public base station via the local base station, while the speech call signals from the public base station can be received by the local mode subscriber.

In the above-described embodiment, the local mode subscriber has communication of call speech signals with the public base station via the local base station if the local mode subscriber is set to the local mode. However, the present invention may also be configured so that, if the incoming call signal from the public base station is received by the local mode subscriber via the local base station when the local mode subscriber is set to the local mode, the control signal from the public base station is detected by the local mode subscriber, and so that, if the control signal from the public base station is detected by this detection by the local mode subscriber, the local mode subscriber is switched to the public mode in order to permit communication to be directly had between the local mode subscriber and the public base station.

Figure 10:
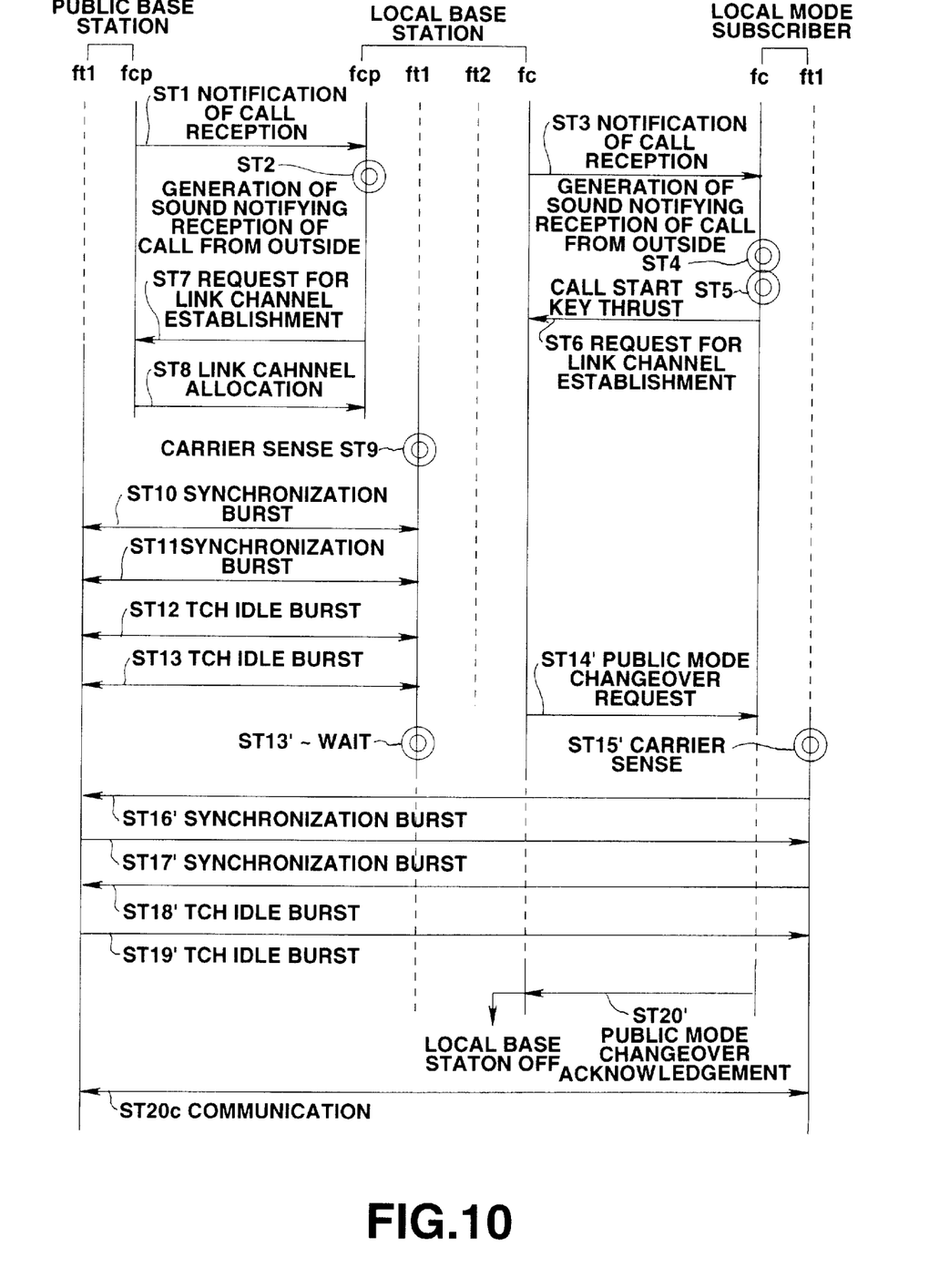
FIG. 10 shows the operation of the local base station and the local mode subscriber.

The operation in this case is explained by referring to FIG. 10.

The operation from step ST1 to ST13 is not specifically explained since it is the same as that in FIG. 8. If then the transmission channel between the public base station and the local base station is established by ft1 by the process up to the step ST13, the local base station sends a request signal for switching to the public mode to the local mode subscriber by fc at step ST14', at the same time as it enters a standby mode at step ST13" for waiting for the response from the local mode subscriber. At step ST14', the local mode subscriber senses the carrier by ft1 at step ST15' in order to check whether or not the local mode subscriber can have direct communication with the public base station. The operations of steps ST16' to ST19' are then carried out between the local mode subscriber and the public base station. Since the operations are equivalent to those of steps ST10 to ST13, the local mode subscriber and the public base station are interconnected by these operations by ft1. If the local mode subscriber has confirmed that the circuit interconnection has been made at step ST19', the local mode subscriber transmits a signal to the local base station to the effect that the local mode subscriber itself switches to the public mode since that time in order to have direct communication with the public base station. This signal is the public mode changeover ACK signal ST20' by fc. At step ST20', the local base station recognizes that the role of an arbitrator for establishing the connection between the local mode subscriber and the public base station has come to a close to terminate the operation or to enter the usual standby mode.

The direct communication between the local mode subscriber and the public base station is started at step ST20C.

In the communication apparatus according to the present invention, plural local mode subscribers may also be used. The local mode subscriber can have signal communication with the public base station directly or via the local base station. If the present invention is applied to a communication apparatus having two or more local mode subscribers, signal communication with the public base station may be had by one of the subscribers, while the signal communication with the public base station may be had by another local mode subscriber via local base station for having two calls simultaneously by line wires.

What is claimed is:

1. A communication apparatus comprising:

radio communication means for communicating wirelessly with each one of (a) a base station of a public radio telephone network (PRTN) as a first destination, with said communication apparatus being in a first mode as a PRTN subscriber and (b) a subscriber of a local radio telephone network (LRTN) as a second destination, with said communication apparatus being in a second mode as an LRTN base station;

wired communication means including a wired communication circuit for having communication through a wired communication network; and communication control means for controlling operations of said radio communication means and said wired communication means, said communication control means including wireless communication connection means for controlling said radio communication means to operate in said first mode and said second mode to relay by wireless transmission a first wireless communication signal received from said PRTN base station to said LRTN subscriber and to relay by wireless transmission a second wireless communication signal received from said LRTN subscriber to said PRTN base station wherein in case of an incoming call from said first destination in first mode, the incoming call is relayed to said second destination is said second mode; and wherein if, after said incoming call information is relayed to said second destination in said second mode, a state of said secnd wireless communiaton signal recieved from said second destination meets predetermined conditions, said communicaton apparatus changes to operation in a third mode in which said first and second destination are coonnected directly to each other and said communication apparatus does not participate in the communication between said first and second destinations.

2. The communication apparatus as claimed in claim 1 wherein signals of said first and second modes are of TDMA format.

3. The communication apparatus as claimed in claim 1 wherein a signal of said second mode is synchronized to a timing of a signal of said first mode.

4. The communication apparatus as claimed in claim 2 wherein
 a signal of said second mode is synchronized to a timing of a signal of said first mode.

5. The communication apparatus as claimed in claim 4 wherein said synchronization is synchronizing for a slot timing.

6. The communication apparatus as claimed in claim 4 for communicating with another apparatus through at least one of said public telephone network, said local radio telephone network and said wired communication network, further comprising:
 transmission signal generating means for generating transmission signals;
 signal processing means for processing received signals; and
 operating means for controlling the operation of said communication apparatus in accordance with user operation.

7. A communication apparatus comprising:
 radio communication means for transmitting to and receiving from each one of a first destination in a first mode and a second destination in a second mode an RF signal;
 transmission signal generating means for generating transmission signals for transmission by said radio communication means;
 signal processing means for processing received signals received by said radio communication means;
 operating means for controlling the operations of said communication apparatus in accordance with user operation; and
 communication control means for controlling the operations of said radio communication means, said transmission signal generating means, said signal processing means and said operating means, said communication control means including
 monitoring means for monitoring a radio wave signal received from said second destination in said second mode to detect a predetermined signal indicating that wireless communication from said first destination was being relayed from said second destination to said communication apparatus; and
 means for terminating the communication in said second mode and starting direct wireless communication in said first mode between said communication apparatus and said first destination without said second destination participating in the direct communication if said predetermined signal is detected in the received radio wave signal by said monitoring means.

8. The communication apparatus as claimed in claim 7 wherein
 in said first mode said communication apparatus operates as a subscriber of a public radio telephone network;
 said first destination is a base station of said public radio telephone network;
 in said second mode said communication apparatus operates as a subscriber of a local radio telephone network; and
 said second destination is a local base station of said local radio telephone network.

9. The communication apparatus as claimed in claim 8 wherein
 signals of said first mode and said second mode are of TDMA format.

10. A method of wireless communication for a communication apparatus comprising the steps of:
 receiving a first RF signal wirelessly from a base station of a public radio telephone network (PRTN) as a first destination by said communication apparatus in a first mode as a PRTN subscriber;
 transmitting a second RF signal wirelessly to a subscriber of a local radio telephone network (LRTN) as a second destination from said communication apparatus in a second mode as an LRTN base station in synchronism with said first RF signal received from said PRTN base station;
 establishing a first wireless communication link from said communication apparatus to said PRTN base station and a second wireless communication link from said communication apparatus to said LRTN subscriber; and
 connecting said first and second communication links for direct wireless communication between said PRTN base station and said LRTN subscriber as the PRTN subscriber without participation by said communication apparatus in said direct wireless communication.

11. A method of wireless communication for a communication apparatus comprising the steps of:
 receiving an RF signal wirelessly from a base station of a local radio telephone network (LRTN) as a first destination, said communication apparatus being in a first mode as an LRTN subscriber;
 monitoring in said first mode said RF signal received from said LRTN base station to detect a predetermined signal indicating that wireless communication from a base station of a public radio telephone network (PRTN) as a second destination was being relayed from said LRTN base station to said communication apparatus in said first mode; and
 terminating the communication in said first mode and starting direct wireless communication between on one hand said communication apparatus in a second mode as a PRTN subscriber and on the other hand said PRTN base station, if said predetermined signal is detected in said RF signal received by said communication apparatus in said first mode from said LRTN base station.

12. The communication method as claimed in claim 10 wherein
 signals of said first mode and said second mode are of a TDMA format.

13. The communication method as claimed in claim 11 wherein
 signals of said first mode and said second mode are of a TDMA format.

* * * * *